Figure 1:
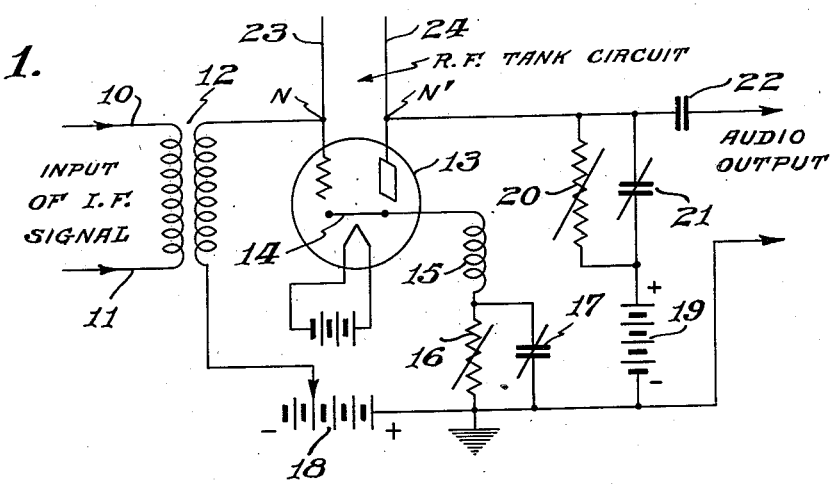
Figure 1:
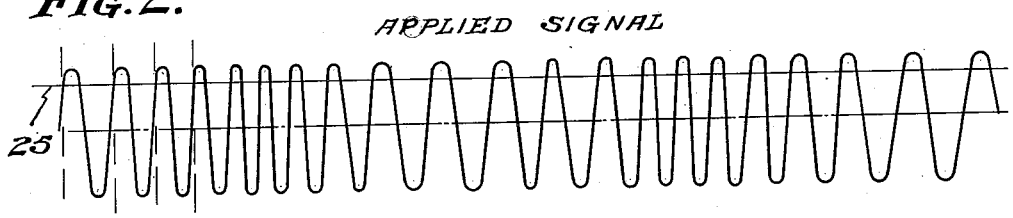
Figure 1:
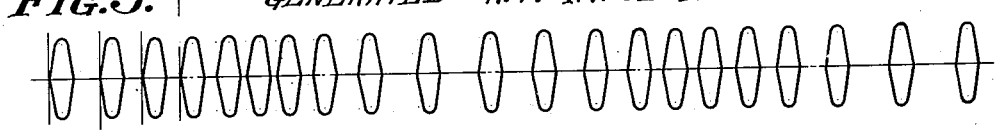
Figure 1:
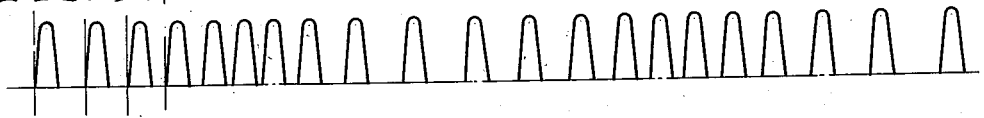
Figure 1:
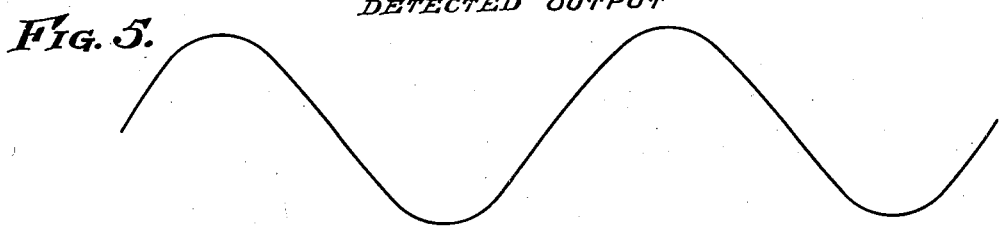

April 29, 1941.   R. C. SANDERS, JR   2,239,757
SIGNAL DETECTING SYSTEM
Filed Jan. 2, 1940

FIG. 2. APPLIED SIGNAL

FIG. 3. GENERATED R.F. IMPULSES

FIG. 4. OCILLATOR ANODE CURRENT

FIG. 5. DETECTED OUTPUT

Inventor
Royden C. Sanders, Jr.
By
Attorney

Patented Apr. 29, 1941

2,239,757

UNITED STATES PATENT OFFICE 2,239,757

SIGNAL DETECTING SYSTEM

Royden C. Sanders, Jr., Audubon, N. J., assignor to Radio Corporation of America, a corporation of Delaware Application January 2, 1940, Serial No. 312,055

3 Claims. (Cl. 250—27)

This invention relates to systems for detecting signals of the frequency modulated type, and has for its principal object the provision of an improved system and method of operation which have the advantages inherent in the operation of an oscillation generator arranged to deliver a predetermined quantity of electricity in response to each cycle of the received signal.

Various types of systems for detecting frequency modulated signals have been proposed. These various systems each include one or another type of network for converting changes in frequency to corresponding changes in voltage or amplitude. The present system differs from previous systems in that it involves the use of a relaxation or self-quenching oscillation generator which delivers, in response to each cycle of the received signal, a quantity of electricity having a value substantially independent of the period of the cycle. Among the important advantages of this improved detecting system are its freedom from noise and its simplicity of construction.

The invention will be better understood from the following description considered in connection with the accompanying drawing, and its scope is indicated by the appended claims.

Referring to the drawing:

Figure 1 is a wiring diagram of a frequency modulated signal detecting system, and Figures 2 to 5 are explanatory curves relating to the operation of the system of Fig. 1.

The system of Fig. 1 includes frequency modulated signal supply terminals 10 and 11 connected through a transformer 12 to the grid or input circuit of an electron discharge device 13, which is provided with a cathode 14 connected to ground through a reactor 15 and a resistor 16, the latter being shunted by a capacitor 17. It will be noted that the elements 15 and 16 are common to the grid and anode circuits of the device 13, and that the oscillator grid circuit includes a biasing battery 18. Anode potential for the operation of the device 13 is applied from a voltage source 19 through a resistor 20 which is shunted by a capacitor 31. Through a coupling capacitor 22, the detected signal may be delivered to a utilization or load circuit, not shown.

In considering the operation of the system of Fig. 1, it should be understood that (1) the grid and anode of the device 13 form part of a parallel line tank circuit 23—24 and the input and output leads are connected to the electrical center of this line at points N and N', (2) the radio frequency choke or reactor 15 is illustrated as one satisfactory means of increasing feedback at the oscillation frequency from the anode to the grid circuit of the device 13, (3) the negative bias potential of the battery 18 is so adjusted that, when the applied signal reaches about two-thirds its maximum positive value, the instantaneous voltage of the grid is less than cutoff, and high frequency oscillations are started, (4) these oscillations charge the capacitor 17 and raise the potential of the cathode 14 to a point where the oscillations are interrupted, (5) these oscillatory periods or pulses are equal and occur at a frequency which is the same as that of the received signal, and (6) the resistor 20 and capacitor 21 integrate these high frequency pulses into the detected signal.

Thus the system of Fig. 1 functions as an ultra high frequency oscillator which, in the absence of a received signal, is prevented from oscillating by applying to its grid circuit a bias potential which is slightly more negative than that required to establish an oscillatory condition. The frequency modulated signal applied to the input terminals 10 and 11 is illustrated by Fig. 2.

With the potential of bias battery 18 adjusted, as indicated by the line 25 of Fig. 2, to a value such that oscillation starts when the signal reaches about two-thirds its maximum positive value, high frequency oscillations are started and stopped as indicated by Fig. 3. During each oscillation pulse, the capacitor 17 is charged, thus raising the potential of the cathode 14 to a potential at which the oscillations are blocked or stopped. The resistor 16 and capacitor 17 thus function to quench the oscillations in a definite period of time which is independent of the period of applied signal cycle which produces the oscillation pulse. Thereafter the capacitor 17 is discharged through the resistor 16 and the cathode potential is decreased to its normal value before the next cycle of the received signal.

The anode current of the oscillator is illustrated by Fig. 4. It consists of series current impulses which (1) are of the same size and shape and (2) occur at time intervals corresponding to the frequency of the received signal.

The function of the resistor 20 and capacitor 21 is to integrate these current impulses into the detected signal which is illustrated by the curve of Fig. 5.

It should be understood that circuit arrangements other than that illustrated are available for quenching the generated oscillations. Thus the oscillations may be quenched by a resistance-capacity network connected in the oscillator grid circuit or by other well known expedients. The particular quenching means best suited to the purpose depends on the signal frequency, since this determines the required rapidity of the quenching action.

As previously indicated, an important advantage of the improved system is a better signal-to-noise ratio. This improvement in signal-to-noise ratio is due to the fact that each radio frequency cycle starts off a uniform ultra high frequency pulse which is a component part of the detected signal. The detected signal voltage is dependent on the number of such pulses received in a given time. Thus in the use of a detected signal having 5000 cycles per second, the instantaneous signal voltage might be considered as the average of the radio frequency pulses over $1/100,000$ of a second. Hence if the received signal frequency is 2,000,000 cycles per second or 2,100,000 cycles per second, there are 20 or 21 radio frequency pulses averaged to make the instantaneous voltage of the detected signal and, according to whether there are 20 or 21 cycles, the instantaneous voltage of the detected signal is larger or smaller. Whether or not a given radio frequency pulse is advanced or retarded in phase due to the presence of noise, no effect is produced on the resultant voltage of the detected signal. During the periods of the ultra high oscillations, the improved detecting system is obviously insensitive to noise.

I claim as my invention:

1. In a system for detecting signals of the frequency modulated type, the combination of an oscillator generator provided with control grid and anode circuits, means for biasing said control grid circuit to a potential sufficient to produce oscillations only in response to different cycles of said signal, and means for quenching said oscillations within a time which is independent of the frequency of the received signal.

2. In a system for detecting signals of the frequency modulated type, the combination of an oscillation generator provided with control grid and anode circuits, means for biasing said control grid circuit to a potential sufficient to produce oscillations only in response to different cycles of said signal, and means including a resistor-capacitor network for quenching said oscillations within a time which is independent of the frequency of the received signal.

3. In a system for detecting signals of the frequency modulated type, the combination of an oscillation generator provided with control grid and anode circuits, means for biasing said control grid circuit to a potential sufficient to produce oscillations only in response to different cycles of said signal, and means including a resistor-capacitor network common to said control grid and anode circuits for quenching said oscillations.

ROYDEN C. SANDERS, JR.